United States Patent [19]

McReynolds et al.

[11] Patent Number: 5,198,944

[45] Date of Patent: Mar. 30, 1993

[54] SYSTEM FOR LOCATING AND HOLDING A CARTRIDGE

[75] Inventors: David P. McReynolds; Thomas J. Schmitt, both of Tucson, Ariz.; Syed T. Shafaat, Clinton, Wash.; Raymond Yardy, Tucson, Ariz.

[73] Assignee: International Business Machines Corporation, Armonk, N.Y.

[21] Appl. No.: 757,423

[22] Filed: Sep. 10, 1991

[51] Int. Cl.⁵ ............................................. G11B 17/02
[52] U.S. Cl. .............................. 360/99.06; 360/99.07; 360/99.12
[58] Field of Search ............... 360/98.05, 98.06, 98.08, 360/99.06, 99.07, 99.12

[56] References Cited

U.S. PATENT DOCUMENTS

| | | |
|---|---|---|
| 3,394,898 | 7/1968 | Laa . |
| 3,608,908 | 9/1971 | Yamamota et al. . |
| 3,864,744 | 2/1975 | Ueraura . |
| 4,060,838 | 11/1977 | Meermans . |
| 4,402,024 | 8/1983 | Kato . |
| 4,878,139 | 10/1989 | Hasegawa et al. ............... 360/99.06 |
| 5,005,093 | 4/1991 | Inoue et al. ....................... 360/99.06 |
| 5,136,570 | 8/1992 | Takai et al. ....................... 360/99.06 |

*Primary Examiner*—David P. Porta
*Attorney, Agent, or Firm*—Greenlee & Winner

[57] ABSTRACT

A recording/playback apparatus in which movable datum pins are held in a base casting. Upon insertion of a cartridge into a holding tray, within the apparatus, the pins are released to move into datum holes in the cartridge when the holes are positioned directly above the pins. The cartridge is then lowered onto the drive spindle and positioned on surfaces of the base casting. During the load cycle, the cartridge is allowed to move relative to the holding tray while continuing to be held in place relative to the base casting by the datum pins.

9 Claims, 8 Drawing Sheets

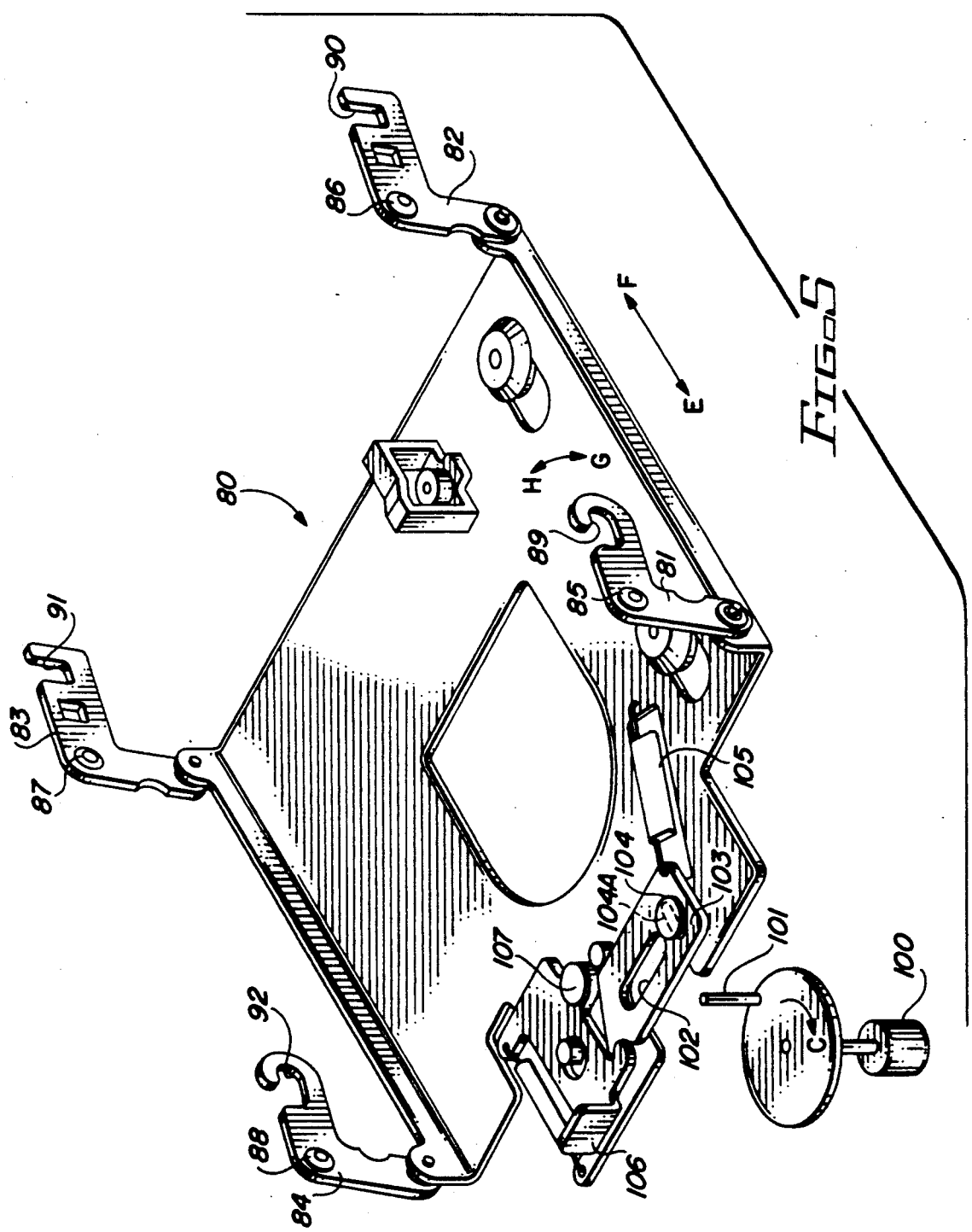

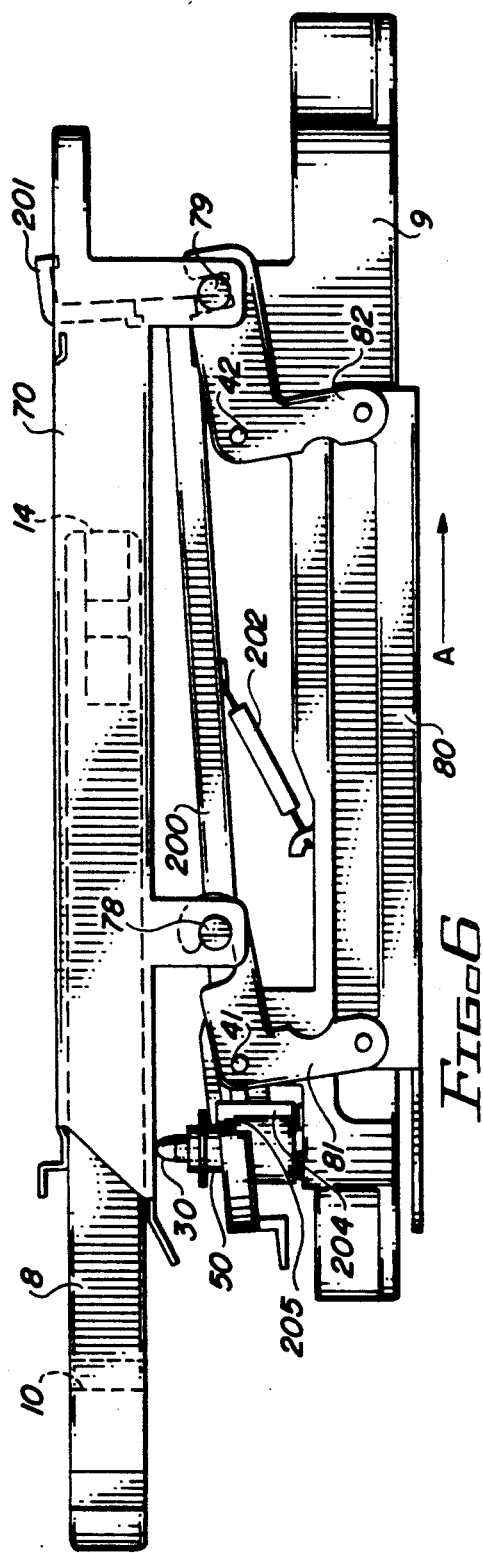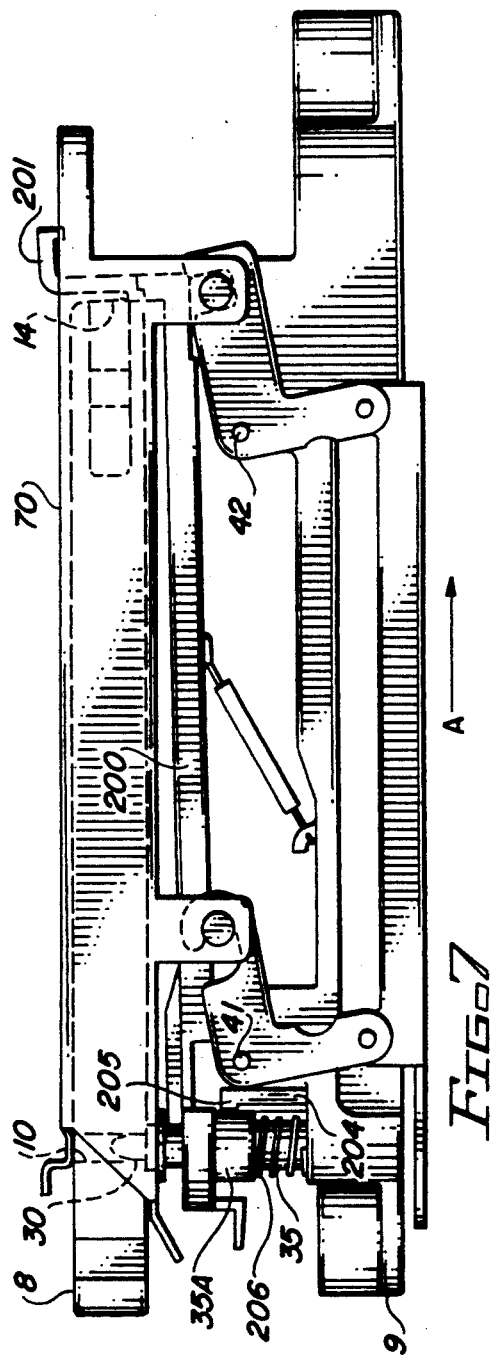

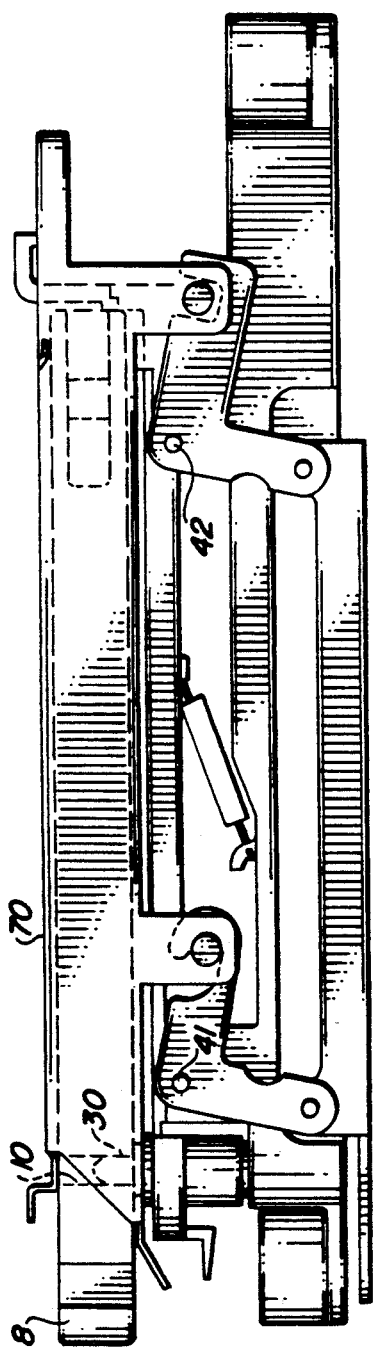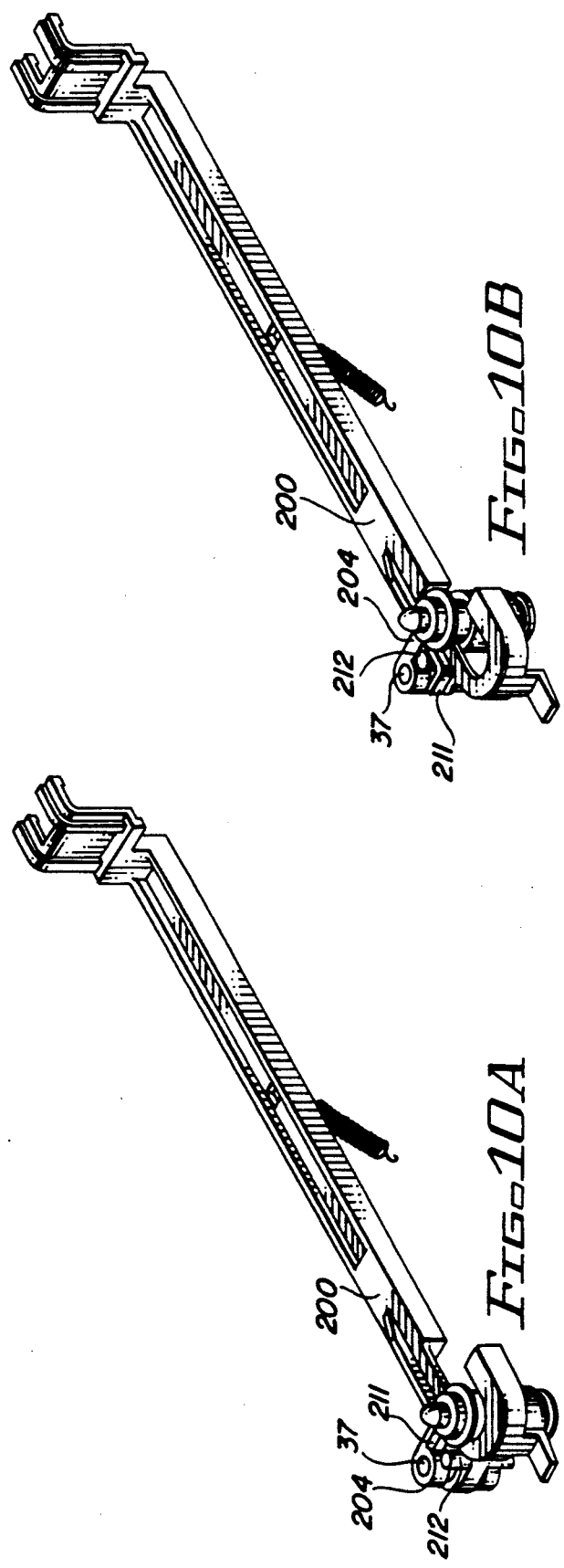

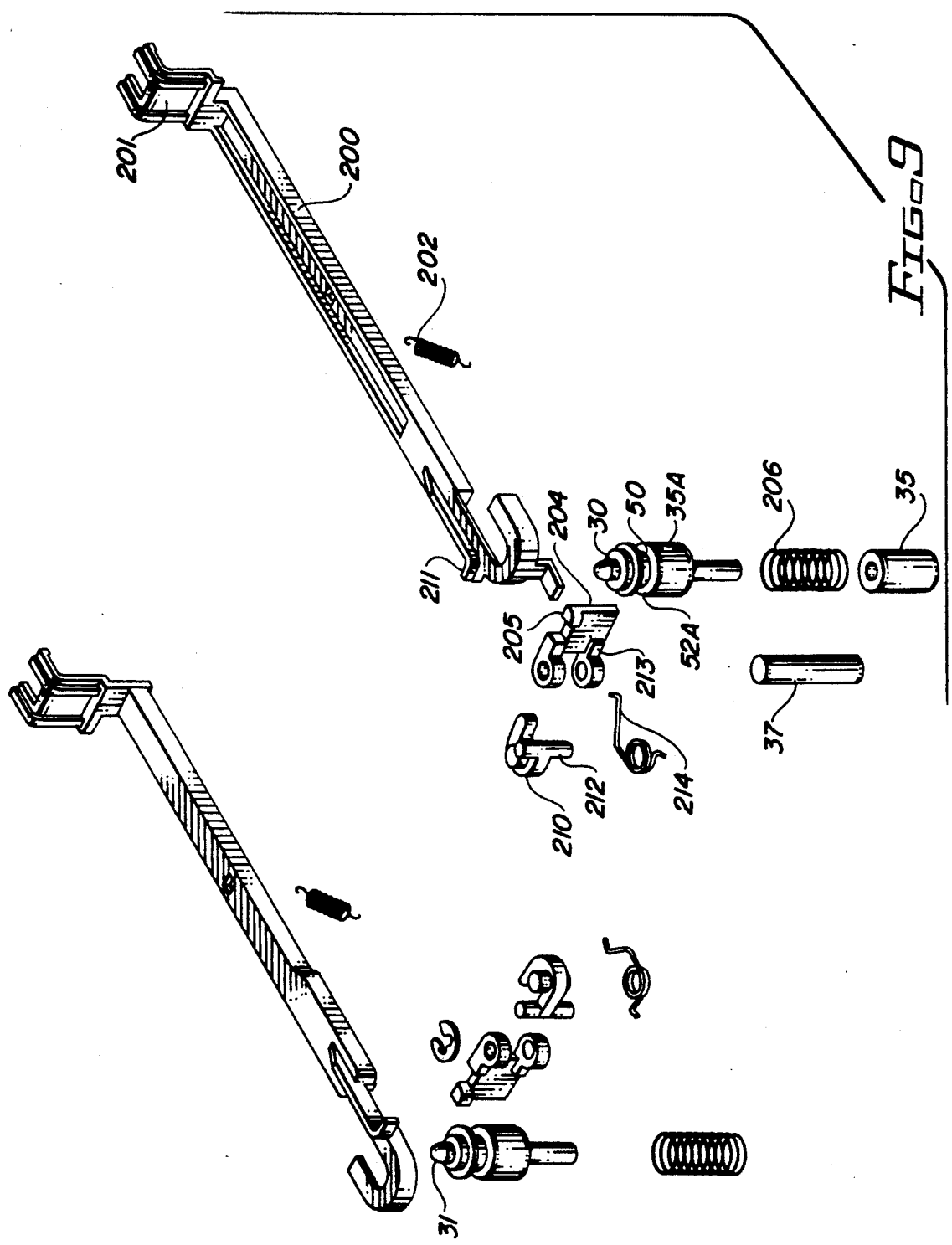

SYSTEM FOR LOCATING AND HOLDING A CARTRIDGE

This invention relates to recording/playback apparatus for use with standardized cartridges, and more particularly to mechanisms for locating and holding the cartridge within the apparatus.

BACKGROUND OF THE INVENTION

The American National Standards Institute (ANSI) has developed cartridges with standard dimensions for holding recording media. In that manner the manufacturers of cartridges and the manufacturers of recording/playback apparatus (drives) have the capability of developing their respective products for use with a variety of other manufacturers products. The standard cartridge includes datum features, for example, locating holes, that are designed to mate with datum features in a drive, for example locating pins, to accurately position the cartridge within the drive. Holding features in the cartridge such as notches and recesses, are dimensioned relative to the datum features. After insertion of a cartridge into a drive, the notches are typically used to hold the cartridge while it is loaded onto the drive spindle and simultaneously loaded onto the locating pins.

The front and side edges of the standard cartridge are held to a tight tolerance relative to the locating holes, the datum features of the cartridge, whereas holding features for example, notches and recesses, located in the sides of the cartridge, are less tightly toleranced. For that reason wear of the locating holes and cartridge hub occur during loading as the cartridge is moved onto the locating pins. The inventors herein have developed an apparatus design for holding the cartridge before and during the loading operation by means of locating pins inserted into the locating holes as well as using the locating pins and holes to position the cartridge within the drive after loading is accomplished.

The inventors herein have sought to repeatedly position and hold the cartridge in a manner which minimizes wear on the locating holes as well as on the hub within the cartridge upon which the media is mounted. In that manner, the life of the cartridge, that is the number of loads which the cartridge can withstand before wearing out, is substantially increased.

In the prior art, holding of the cartridge within the drive is typically accomplished before the loading operation by mating holding notches in the exterior case of the cartridge with corresponding features in the inside surfaces of a holding tray or sleeve. Thus, holding and positioning of the cartridge is accomplished prior to the motion to load the cartridge into a mating relationship with the spindle. Such a design may inaccurately position the locating holes of the cartridge relative to the locating pins and the hub of the cartridge and the spindle relative to each other, dependent on tolerances in the cartridge case, the holding tray, the tray bushings, and the base plate. As a result, the loading operation may forcibly reposition the cartridge on the locating pins and the spindle thus wearing the hub and the locating holes and may result in jamming the load mechanism.

The inventors herein have sought to eliminate this buildup of tolerances and have developed apparatus to accomplish the elimination of tolerances associated with the tray, loader arms, drive plate, base casting and spindle motor. Also, by accurately positioning the cartridge relative to the locating pins before lowering the cartridge, wear on the hole is minimized. Finally, by accurately positioning the cartridge before loading it on the spindle, wear on the cartridge hub is minimized.

SUMMARY OF THE INVENTION

This invention provides mechanisms within a recording/playback apparatus to locate and hold a standard cartridge within the apparatus before, during, and after a load cycle by means of a moveable locating pin positioned within a receptacle in a base casting. The cartridge is positioned with its locating hole directly above the locating pin before the locating pin is allowed to move into the locating hole. The load cycle is not allowed to commence until the cartridge is positioned on the locating pin. During the load cycle, the cartridge is allowed to slide relative to the holding tray while continuing to be held in place relative to the base casting by means of the locating pin.

BRIEF DESCRIPTION OF THE DRAWINGS

The above mentioned features of this invention and the manner of obtaining them will become more apparent and the invention itself will best be understood by reference to the following description of the invention taken in conjunction with the accompanying drawing the description of which follows.

FIG. 5 shows a drive plate located within the said playback apparatus on the base casting of FIG. 2. The drive plate is used for lowering the holding tray of FIG. 4 and a cartridge therein on to a drive spindle.

FIG. 6 shows a side assembly view of the locating mechanisms of this invention positioned on the base of FIG. 2.

FIG. 7 is a second side assembly view of the locating mechanisms of this invention with the locating pin inserted into the locating hole of the cartridge to locate the cartridge within the playback apparatus.

FIG. 8 is another side assembly view of the mechanisms of this invention showing the cartridge lowered in place within the playback apparatus.

FIG. 9 is an exploded view of the locating and holding mechanisms of this invention.

FIGS. 10A and 10B are assembly views of the locating and holding mechanisms of this invention.

DETAILED DESCRIPTION

Figure 1:
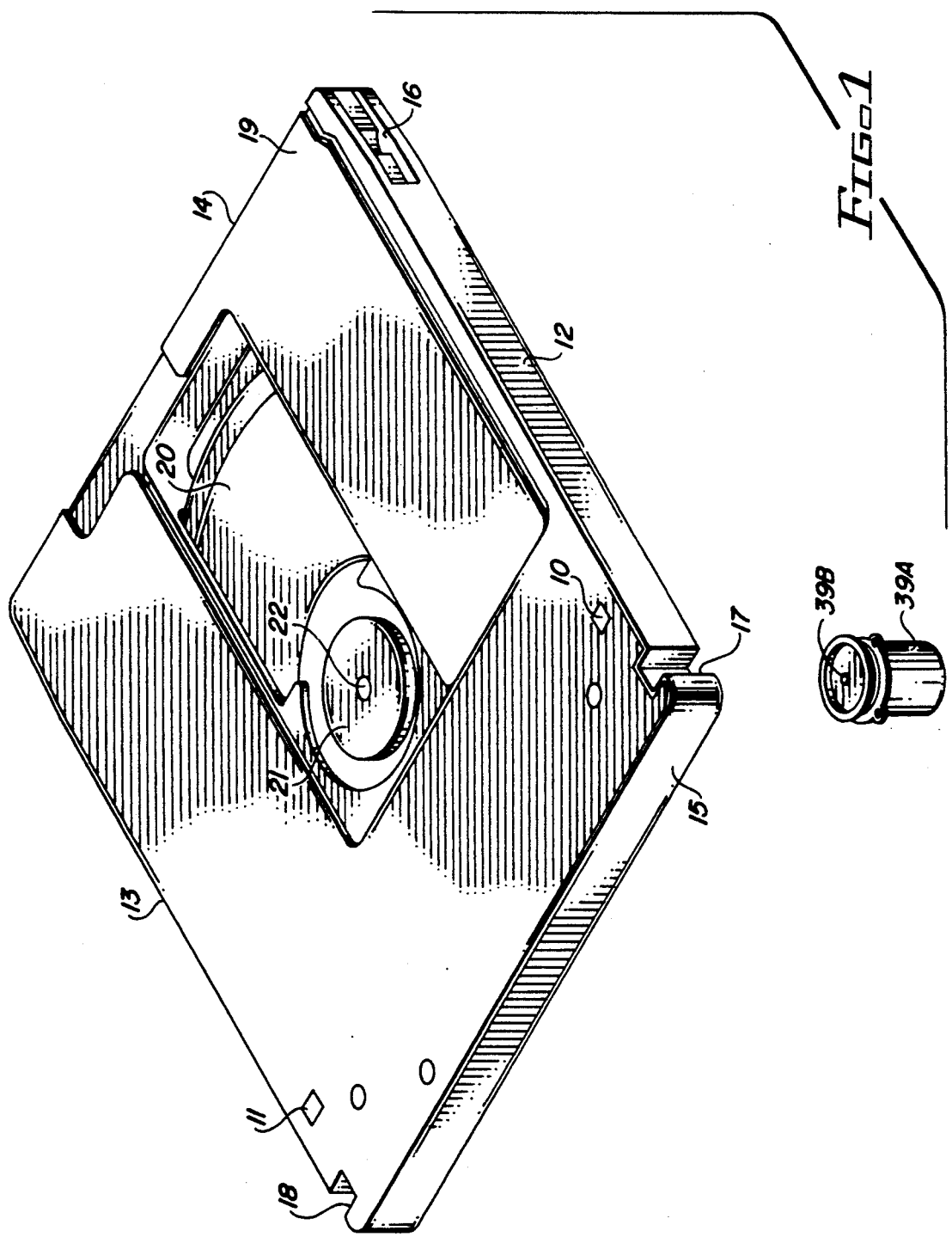
FIG. 1 shows a perspective view of a standard ANSI cartridge together with a typical spindle motor.

FIG. 1 is a perspective view of a standardized ANSI cartridge containing disk media. The cartridge contains locating datums, that is locating holes 10 and 11. The side edges 12 and 13, the front edge 14 and the rear edge 15 are held to a tight tolerance with respect to locating holes 10 and 11. The cartridge also contains gripper slots or notches 17 and 18 and holding detent 16 in side edge 12 with a similar holding datum (not shown) on the opposite side edge 13. Many systems utilize either the holding datum 16 or the gripper slots 17 and 18 to hold the cartridge within a holding tray while it is loaded onto the motor spindle and onto the locating pins.

As the holding features 16, 17, and 18 are different from the locating datums 10 and 11, one of the common problems associated with holding the cartridge in place is a tolerance buildup between the locating datums and the holding features in the cartridge. As a result, the locating pins in the drive may sometimes need to be forced into the locating holes 10 and 11. This in turn causes excessive wear in the locating holes in the cartridge which ultimately causes the cartridge to slip as the loader moves the cartridge onto the spindle 39B of the spindle motor 39A. In that manner centering hole 22 of the hub 21 is worn and wear particles may contaminate components in the drive. Basically, the problem is that the holding features are not adequate to hold the cartridge in position to mate reliably with locating pins over a large number of loading operations.

FIG. 1 also shows a shutter door 19 opened to expose the media disk 20 inside the cartridge as well as showing the hub 21 upon which the media disk 20 is mounted. A drive spindle 39B will be inserted through the center hole 22 of hub 21 when the cartridge is lowered into position onto the drive spindle motor 39A.

FIG. 2A shows the base 9 of the playback apparatus implementing this invention. Base 9 is preferably cast. Locating pins 30 and 31 are mounted in bushings which in turn are held in receptacles 32 and 33 which are an integral part of the base. In this invention, one or both of the locating pins 30 and 31 are made moveable to move into the locating holes 10 and 11 of the cartridge shown in FIG. 1. To facilitate movement of the locating pins, bushings 35 and 36 are inserted into the receptacles 32 and 33 of the base casting with the locating pins 30 and 31 mounted within the bushings.

FIG. 2A also shows pins 37 and 38 mounted in base casting 9; these pins are used to mount portions of the mechanisms which control motion of the locating pins 30 and 31 as will be described hereinafter.

The base casting 9 has a central area 39 into which the spindle motor (not shown) is placed and fastened to the base casting. Base casting 9 also contains an area 40 into which is placed and mounted a motor for lowering the cartridge onto the spindle motor and raising it therefrom.

Figure 4:
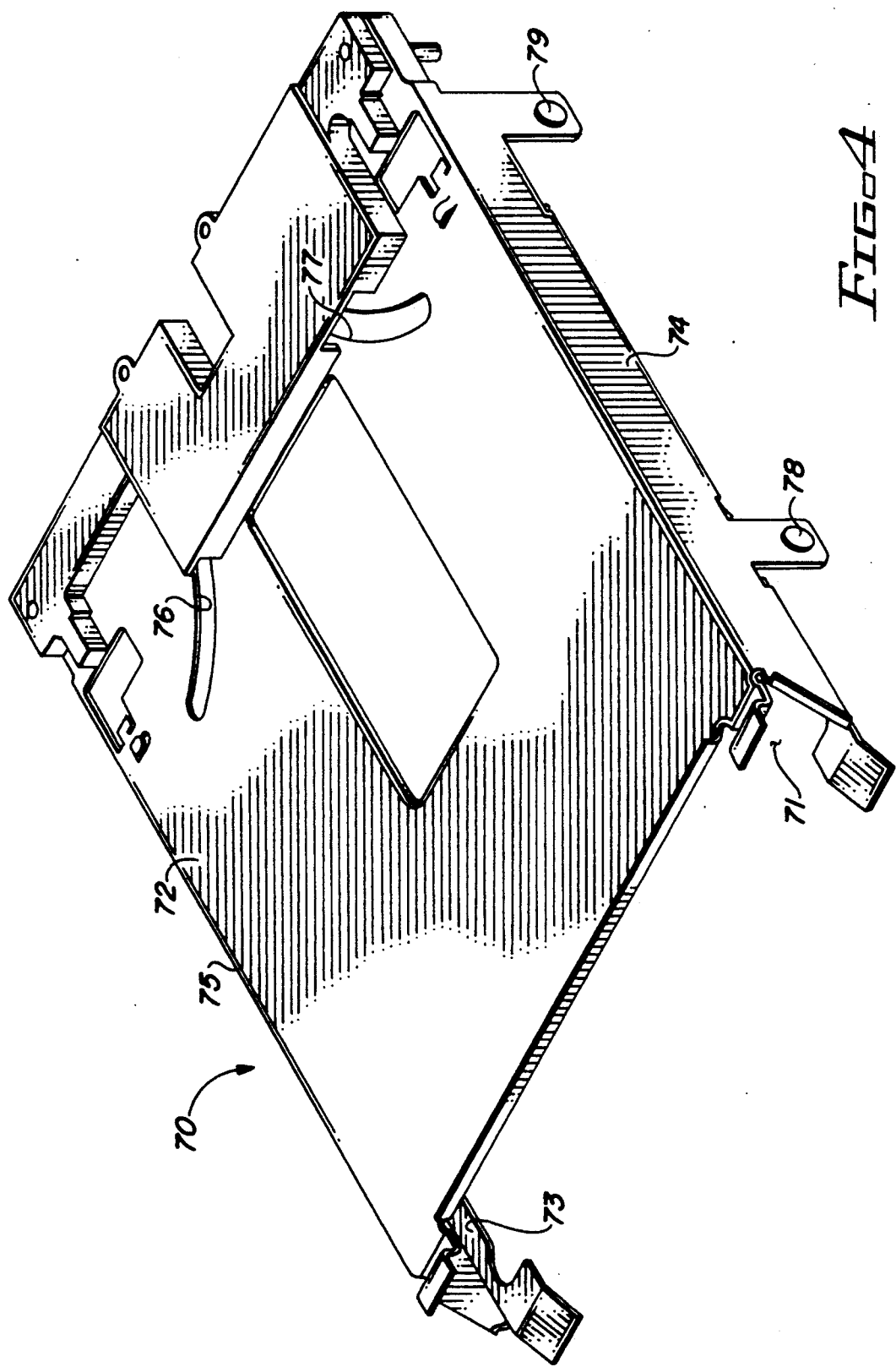
FIG. 4 shows a perspective view of a holding tray located within the recording/playback apparatus for receiving the cartridge of FIG. 1.

FIG. 2A shows shafts 41, 42, 43, and 44 located in the base casting 9. These shafts are used for mounting arms which are connected to a drive plate (FIG. 5) and to a tray (FIG. 4). The tray receives the cartridge when it is inserted into the drive apparatus.

When a cartridge is loaded onto the spindle motor the bottom surfaces of the cartridge are brought solidly against two reference surfaces which are part of the base casting, that is, surfaces 47 and 48. Two other surfaces, 45 and 46 also support the cartridge and are machined into locating pins 30 and 31 respectively. Locating pins 30 and 31 are positioned solidly against bushings 35 and 36 in the base casting 9 when the cartridge is fully loaded into the playback apparatus, thus providing four solid surfaces 45-48 in the base casting for mounting the cartridge in the recording/playback position.

FIG. 2B shows locating pin 30 positioned in bushing 35 which is mounted in base casting 9. Pin skirt 35A is pressed onto pin 30 and acts as an integral part thereof. Spring 206 acts to bias pin 30 upwardly. Recessed area 50 and surface 52A act to receive a latching mechanism to hold pin 30 against base 9. Surface 45 acts to position a loaded cartridge.

Figure 3:
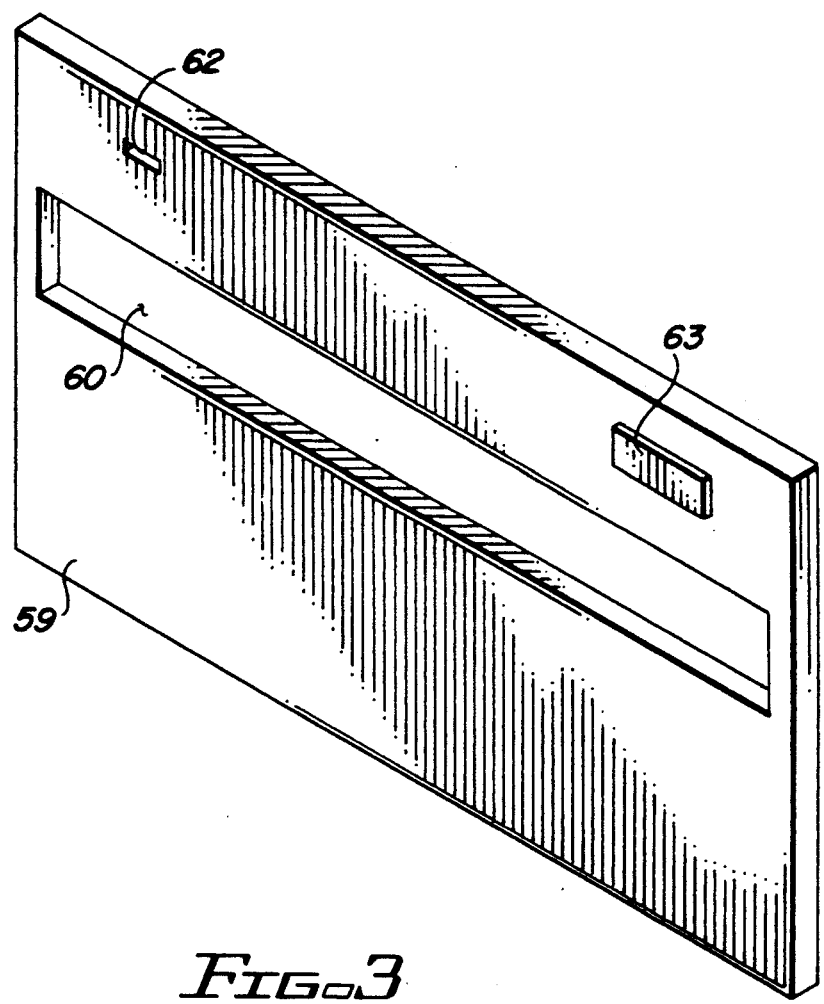
FIG. 3 shows the front exterior face of the recording apparatus.

FIG. 3 shows the front face 59 of a playback apparatus incorporating the instant invention. An entrance opening 60 is provided through which a cartridge may be inserted into the playback apparatus. FIG. 3 also shows an opening 62 for accepting a "drive busy" indicator such as a light emitting diode (LED) and an eject button 63.

FIG. 4 shows a holding tray 70 for receiving a cartridge inserted into the apparatus. Such insertion may be accomplished manually or by insertion apparatus such as might be present in a library device. The tray contains an opening 71, a top surface 72, a bottom surface 73 and side surfaces 74 and 75. Slots 76 and 77 are provided in the top surface 72 to accommodate arms (not shown) which open the shutter door 19 of a cartridge containing disk media upon insertion of such a cartridge into the tray.

FIG. 4 also shows pins 78 and 79 which are used to attach the tray 70 to arms which lower and raise the tray. Pins (not shown) similar to pins 78 and 79 are located on the opposite side of tray 70.

Figure 2:
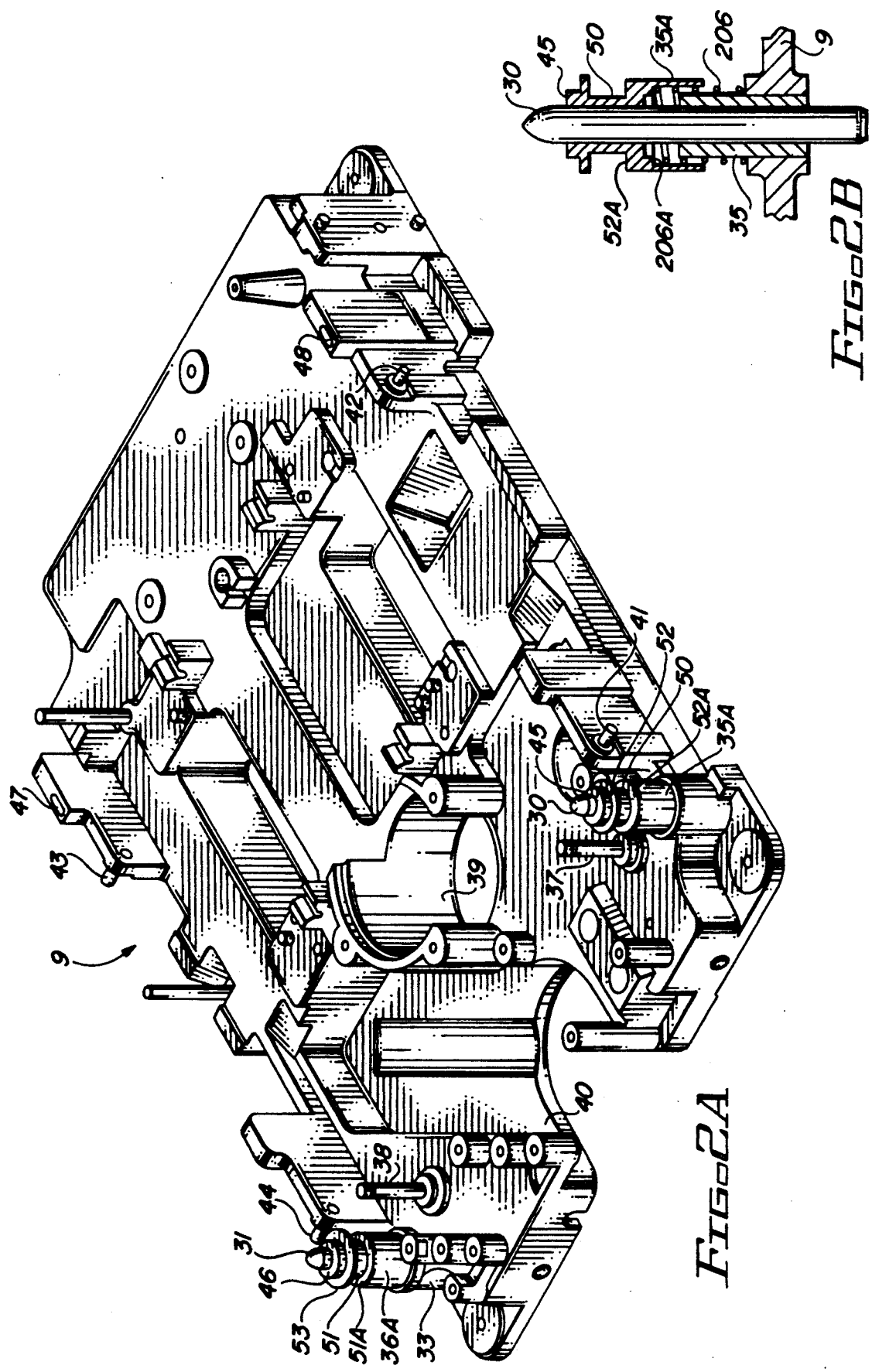
FIG. 2, comprised of FIGS. 2A and 2B, shows a base casting for recording/playback apparatus designed for use with the standardized cartridge of FIG. 1 and incorporating features for practice of this invention together with a sectional view of the locating pin and bushing assembly.

FIG. 5 shows a drive plate 80 with arms 81, 82, 83, and 84 attached thereto. Arm 81 contains a bushing 85 through which the pin 41 (FIG. 2) is inserted. Pin 41 is attached the base casting 9 as shown in FIG. 2. Similarly, arm 82 contains a bushing 86 which is fit onto the pin 42. Arm 83 contains a bushing 87 which is fit onto pin 43 and arm 84 contains bushing 88 which is fit onto pin 44. In that manner the drive plate 80 is accurately positioned relative to the drive casting 9 and is located below the drive casting.

FIG. 5 shows arm 81 containing a slot 89; arm 82 contains a slot 90; arm 83 contains a slot 91; and arm 84 contains slot 92. Slot 89 connects to pin 78 in the holding tray 70 shown in FIG. 4. Similarly, slot 90 connects with pin 79. The pins (not shown) on the opposite side of the holding tray shown in FIG. 4 connect into slots 91 and 92. In that manner the tray 70 is positioned accurately at four points with respect to the base casting.

FIG. 5 also shows a graphical depiction of the lowering motor 100 with respect to the drive plate 80. An eccentric pin 101 is inserted into a slot 102 formed in an overtravel plate 103. Plate 103 is connected to drive plate 80 by pin 104. Plate 103 contains a slot 104A, shown in phantom. Plate 103 is biased against one side of slot 104A by spring 105 as shown in FIG. 5.

FIG. 5 also shows a manual unloading latch, 106 which is connected by pin 107 to plate 80.

FIG. 6 is a side assembly view of some of the mechanisms in the playback apparatus. Base casting 9 is shown with the drive plate 80 positioned under the base casting 9 and tray 70 positioned above the base casting 9. Pins 78 and 79 connect the drive plate 80 with the tray 70 through arms 81 and 82 which are pinned to the drive casting by pins 41 and 42.

FIG. 6 shows a cartridge 8 partially inserted into the playback apparatus. Cartridge 8 contains a locating hole 10 which, when the cartridge is moved far enough into tray 70 will be positioned directly above the locating pin 30. A recessed area 50, part of the locating pin 30, is shown. A catch 204 with a lip 205 is shown engaging a surface of recessed area 50.

A trip arm 200 is shown in FIG. 6 with a tab 201 at one end thereof. Tab 201 extends upwardly into tray 70 such that when the cartridge 8 is inserted far enough in direction A, a front end 14 of cartridge 8 will strike tab 201. A spring 202 biases the trip arm 200 to the position shown in FIG. 6.

FIG. 7 is a side assembly view of the mechanisms shown in FIG. 6 with the cartridge 8 having been inserted in direction A to the point that the front of the cartridge 14 has contacted tab 201 and pushed the trip arm 200 forward until locating hole 10 is directly above the locating pin 30. FIG. 7 shows that the locating pin 30 has been released by the catch 204 to allow spring 206 to urge the locating pin 30 upwardly into the locating hole 10. Spring 206 is located around bushing 35 and bears against flange 206A of the locating pin 30 as shown in FIG. 2B.

FIG. 8 is a side view similar to FIGS. 6 and 7 showing the cartridge and tray lowered into position such that the media in cartridge 8 can be read or written. Locating pin 30 remains inserted in locating hole 10.

FIG. 9 is an exploded view of the mechanisms which hold and release the locating pin. Trip arm 200 with tab 201 and spring 202 are shown. Locating pin 30 with a recessed area 50 and a surface 52A is shown. Catch 204 with lip 205 and surface 213 is shown. Catch trip 210 with a post 212 is shown. Tab 211, an integral part of trip arm 200 is shown. Pin 37 which is inserted into the base casting and upon which the catch and catch trip are mounted is shown. Spring 206 which urges the locating pin 30 upwardly, is shown. Torsion spring 214 is placed on pin 37 with one arm hooked on bushing 35 and the other arm on post 212. Torsion spring 214 acts to bias catch trip 210 in a manner that causes catch trip 210 to exert a clockwise force on catch 204, thereby moving lip 205 to engage surface 52A in recessed area 50. FIG. 9 also shows a second assembly for controlling the movement of locating pin 31. As previously mentioned, either one or two moveable locating pins may be provided.

FIG. 10A is an assembly view of the trip arm assembly shown in FIG. 9 where the cartridge has been inserted to a point where the locating pin has been released to move upwardly into the locating hole in a cartridge. FIG. 10B is a similar view of the trip arm assembly before the locating pin is released upwardly. FIGS. 10A and 10B show the relative positions of the post portion 212 of the catch trip, the tab 211 which is part of the trip arm 200, and the catch 204. The assembly view shows the catch and catch trip mounted on pin 37. Note that with the cartridge fully inserted, FIG. 10A, the tab 211 sits on top of catch trip 210. In FIG. 10B, waiting for a cartridge, tab 211 is in front of catch trip 210.

The operation of the apparatus upon insertion of cartridge 8 will now be described. Particular reference should be made to FIGS. 6, 7, 8, and 9. As a cartridge 8 is inserted into tray 70 in direction A the front end 14 of the cartridge strikes a tab 201 which is moved forward by the continued insertion of cartridge 8. Tab 201 is an integral part of trip arm 200, such that as the tab 201 is moved in direction A, FIG. 6, the tab 211 (FIG. 9) which is also an integral part of the trip arm 200, is brought into contact with the post portion 212 of catch trip 210. As the cartridge continues to be inserted in the direction A, tab 211 presses against post 212 compressing torsion spring 214 causing the catch trip 210 to rotate about pin 37 in a counterclockwise fashion pushing the post 212 against the surface 213 of catch 204. Catch 204 then rotates around post 37 in a counterclockwise fashion causing lip 205 to disengage from the surface 52A in the recessed area 50 of the locating pin 30. Once the lip 205 has disengaged from the locating pin 30, pin 30 is moved upwardly under the influence of spring 206 such that pin 30 is inserted into the locating hole 10 of cartridge 8. The dimensions and tolerances of the trip arm 200, the lip 205, the catch 204, and the catch trip 210, are held to a tight tolerance such that the locating hole 10 will be positioned directly above locating pin 30 when release is accomplished.

In assembly, trip arm 200 is captured within recessed area 50 so that as the locating pin 30 moves upwardly it carries trip arm 200 with it. As trip arm 200 moves upwardly, tab 211 lifts beyond engagement with post 212, thus freeing catch trip 210 to rotate in a clockwise fashion under the influence of spring 214. As catch trip 210 rotates, post 212 moves until it is positioned under tab 211, providing a resting place for tab 211. As catch trip 210 rotates in a clockwise fashion, catch 204 also rotates until lip 205 bears against skirt 35A.

A sensor (not shown) such as a photo sensor, is activated by upward motion of the trip arm 200 to cause the lowering motor 100 to operate. Referring now to FIG. 5, as motor 100 turns in direction C eccentric pin 101 bears against the side of slot 102 in overtravel plate 103. Overtravel plate 103 is connected to the drive plate 80 through pin 104 so that drive plate 80 is caused to move in direction E. As drive plate 80 moves in direction E arm 81 rotates around pin 41 (FIG. 2) in bushing 85 such that slot 89 is moved downwardly in an arcuate manner in direction G. Since slot 89 is connected to tray 70 through pin 78, the tray 70 is also moved downwardly in an arcuate manner in direction G. As tray 70 moves downwardly in an arcuate fashion, it carries cartridge 8 in a straight vertical fashion downwardly until the bottom surface of cartridge 8 contacts the base casting at surfaces 47 and 48, FIG. 2, and surfaces 45 and 46, which are part of locating pins 30 and 31. The pins 30 and 31 are moved downwardly by pressure from the cartridge until the locating pins are solidly pressed against bushings 35 and 36, thus positioning the cartridge at four points in a solid manner on the base casting. Overtravel plate 103, FIG. 5, allows the motor 100 to solidly position the pins and the cartridge against the base casting and provide for a slight amount of motor overtravel by allowing the plate 103 to move forward along a slot 104A relative to pin 104 mounted in the drive plate 80.

As the cartridge 8 is lowered onto the base casting, the central hole 22 in the hub 21 is brought down directly onto the spindle 39B of a drive motor 39A which when activated rotates the media 20 such that the media can be read and written. The spindle motor 39A is positioned in the opening 39 of the base casting 9. Since the spindle motor is positioned accurately with respect to the base casting, and the cartridge is held accurately with respect to the base casting by pins 30 and 31 throughout the lowering cycle, the central opening 22 is brought down in an accurate manner onto the spindle in a fashion designed to produce a minimum of wear on the central opening 22 of hub 21.

The described mechanisms enable the locating of cartridge 8 within the playback apparatus in an accurate manner relative to the base casting since the locating pins are held in the base casting. Since the locating pins 30 and 31 remain in locating holes 10 and 11 throughout the lowering motion, cartridge 8 is held accurately in position throughout the lowering cycle.

It should be noted that in the downward movement of pin 30 as the cartridge is lowered into position, torsion spring 214 resets the catch 204 such that the lip 205 re-engages with the recessed area 50 of pin 30, thus holding pin 30 down on the raising cycle.

When it is desired to eject the cartridge from the playback apparatus, an eject button 63, shown in FIG. 3, is pressed, causing the motor 100 to rotate. Thereupon, eccentric pin 101, inserted in slot 102, bears against the overtravel plate 103, causing drive plate 80 to move in direction F, FIG. 5. This in turn causes the slot 89 to rotate in direction H, thus moving the tray 70 upwardly. As tray 70 moves upwardly, the cartridge 8 is lifted from the base casting surfaces 47 and 48 and from the surfaces 45 and 46 of locating pins 30 and 31. Locating pins 30 and 31, however, do not move upwardly since they are once again held in place by lip 205. In that manner the cartridge is allowed to clear the locating pins such that when the shutter arms (not shown) close the shutter door 19, they also partially eject cartridge 8 from the apparatus out through the entrance 60, enabling the user to grasp cartridge 8 and remove the cartridge completely from the playback apparatus either manually or with removal apparatus such as in a library context. The spring 202, connected to the trip arm 200, repositions the trip arm to the position shown in FIG. 6 upon ejection of a cartridge, thereby resetting all of the mechanisms of the trip arm assembly to a ready position in order to receive the next cartridge.

The invention has been illustrated with two trip arm assemblies. However, pin 31 may, for example, be solidly attached to the base casting and pin 30 may be the only moveable pin moving upwardly into the locating holes in cartridge 8. Either embodiment works to locate and hold the cartridge before, during, and after the lowering cycle.

To summarize, as the cartridge is inserted into a drive, the leading edge of the cartridge pushes against the "trip arms." After the cartridge has moved a predetermined distance, the "trip arms" push against the "catch trip." The catch trip engages with the "catch" and pushes it out of the way to release the spring loaded "datum pins." The pins go up and into the datum holes in the cartridge, taking the trip arms with them. As the trip arms go up, they disengage from the catch trip. Once the catch trip is disengaged from the arms, the catch is reset to hold the spring loaded datum pins down once the cartridge is moved onto the spindle motor by the loader mechanism. The trip arms move down with the cartridge, however, they remain disengaged as the presence of the cartridge prevents mechanism reset.

Upon unload, the datum pins are held down by the catch while the cartridge is raised by the loader mechanism. As the cartridge clears the datum pins and reaches the opening in the bezel, it is ejected out. As the cartridge exits the drive, the trip arms are pulled towards the bezel and in front of the catch trip, reset for the next cartridge.

The many benefits of this mechanism include:
1. The drive datum pins move and engage with the cartridge datum holes directly, to hold the cartridge in place during a load cycle.
2. This mechanism is not susceptible to cartridge tolerance build-up in locating it inside the drive.
3. Cartridge datum holes with drive datum pins provide a more positive holding method than holding notches.
4. The mechanism is self resetting. If the mechanism is accidentally tripped, cycling the loader once, will reset it.
5. The mechanism can be adjusted to allow cartridge to travel beyond the datum hole/pin alignment location, so that the drive can be tailored to either manual or machine cartridge loads.
6. The mechanism results in lower cartridge wear as:
   it releases the datum pin when the pin is under the datum hole, thus preventing the datum pin from rubbing against the cartridge.
   the cartridge is not forced onto the datum pins due to tolerance build-up between the cartridge holding feature in the loader and the drive datum pins in the drive base.
7. The datum pins have a bullet nose shaped profile to avoid transition from conical to cylindrical region and thus minimize cartridge wear.
8. Tactile feedback to the operator is provided when the spring loaded pins are released to hold the cartridge.
9. The mechanism can be used either on one or both sides of the drive.
10. Low cost, few parts, easy to assemble.
11. The mechanism can be used with any type of media that is contained in a cartridge.

While this invention has been described with respect to a cartridge containing disk media, it should be obvious to a person of skill in the art, that the locating and holding mechanisms of this invention could be utilized with any cartridge having locating holes therein and in which the cartridge is to be lowered onto the spindles of drive motors. Thus, if tape were the media located in the cartridge, the principals and mechanisms of the invention could still be employed, although upon lowering the cartridge it would be lowered upon two spindles, one to supply the tape and one to receive it.

While the invention has been shown and described with reference to a particular embodiment thereof, it will be understood to those skilled in the art, that various changes in form and details may be made therein without departing from the spirit and scope of the invention.

What is claimed is:

1. A recording/playback apparatus for use with a standard protective cartridge of the type that holds recording media, said standard cartridge having a locating hole placed a specific standard dimension from the front edge of said cartridge, said apparatus comprising:
   a base for locating and holding the mechanisms of said apparatus;
   a movable locating pin positioned within a receptacle in said base, said pin having a recessed area and a flange;
   a spring located between said flange and said base to urge said pin upwardly away from said base;
   a tray mounted with respect to said base, said tray having two sides, a top and a bottom and having an open entrance into which one of said protective cartridges is inserted;
   a moveable trip arm not fixedly connected to said tray, said trip arm having a tab at one end thereof, said tab extending upwardly through the bottom of said tray such that the front end of said cartridge pushes against said tab to move said trip arm upon insertion of said cartridge into said tray;

a second tab located on said trip arm;

a second pin located and held on said base;

a catch trip rotatably mounted on said second pin, said catch trip positioned relative to said second tab such that said second tab bears against said catch trip to rotate said catch trip upon insertion of said cartridge;

a catch rotatably mounted on said second pin, said catch having a lip, said lip positioned within said recessed area of said locating pin to hold said locating pin toward said base, said catch also having a surface positioned relative to said catch trip such that said catch trip bears against said surface of said catch to rotate said catch upon insertion of said cartridge to move said lip from said recessed area to allow said locating pin to move upwardly under the influence of said spring into said locating hole in said cartridge to thereby locate and hold said cartridge relative to said base; and said trip arm, catch trip, catch and locating pin located relative to said base and dimensioned such that said locating pin moves into said locating hole when said hole is positioned directly above said pin, to minimize wear on said locating hole.

2. The apparatus of claim 1 wherein said catch trip has a post, said second tab for bearing against said post, said trip arm located to bear against said pin, said trip arm carried by the upward motion of said pin out of bearing contact with said post, and a torsion spring connected to said catch trip to rotate said post when said post is free of bearing contact with said second tab, to allow said trip arm to rest on top of said post.

3. The apparatus of claim 1 wherein said standard cartridge also has a hub for mounting said media, said apparatus further comprising;

means for lowering said tray such that the bottom surface of said cartridge is positioned solidly against datum surfaces in said base, said cartridge held by said locating pin when said lowering movement is in operation such that said tray is allowed to move relative to said cartridge;

spindle means driven by motor means located within said base such that said hub is lowered onto said spindle by said means for lowering said tray, said cartridge held by said locating pin when the lowering movement is in operation, said lowering movement compressing said spring and moving said locating pin solidly against a datum surface in said base;

whereby said cartridge is located and held with respect to said base on said locating pin before, during and after said lowering movement such that wear on said hub from lowering said hub onto said spindle is minimized.

4. The apparatus of claim 1 further including means for lowering said tray such that the bottom surface of said cartridge is positioned against datum surfaces in said base, said cartridge held by said locating pin when the lowering movement is in operation, said lowering movement compressing said spring and moving said locating pin against a datum surface in said base;

a torsion spring connected to bias said catch, said catch rotating under the influence of said torsion spring when the lowering movement is in operation such that said lip moves into said recessed area to hold said locating pin so that when said tray is raised, said cartridge is allowed to move away from said locating pin so that said cartridge may be ejected from said apparatus.

5. The apparatus of claim 1 wherein said catch trip has a post, said second tab for bearing against said post, said trip arm located to bear against said pin, said trip arm carried by the upward motion of said pin out of bearing contact with said post, and a torsion spring connected to said catch trip to rotate said post when said post is free of bearing contact with said second tab, to allow said trip arm to rest on top of said post, and means for lowering said tray such that the bottom surface of said cartridge is positioned solidly against datum surfaces in said base, said cartridge held by said locating pin when said lowering movement is in operation such that said tray is allowed to move relative to said cartridge;

said torsion spring connected to bias said catch, said catch rotating under the influence of said torsion spring when the lowering movement is in operation such that said lip moves into said recessed area to hold said locating pin so that when said tray is raised, said cartridge is allowed to move away from said locating pin so that said cartridge may be ejected from said apparatus.

6. A recording/playback apparatus for use with a standard protective cartridge of the type that holds recording media, said standard cartridge having a locating hole placed a specific standard dimension from the front edge of said cartridge, said apparatus comprising:

a base for locating and holding the mechanisms of said apparatus;

a movable locating pin positioned within a receptacle in said base;

means connected to said locating pin for urging said pin away from said base;

a tray mounted with respect to said base, said tray having an open entrance into which one of said protective cartridges is inserted;

means within said apparatus for sensing the position of a cartridge inserted into said tray;

releasing means connected to said locating pin and responsive to said means for sensing position for allowing said urging means to move said locating pin away from said base into said locating hole when said hole is positioned to receive said pin;

whereby said cartridge is located and held relative to said base.

7. The apparatus of claim 6 wherein said means for sensing the position of a cartridge inserted into said tray includes a trip arm with a tab, said tab extending into said tray such that the front end of said cartridge pushes against said tab upon insertion of said cartridge.

8. The apparatus of claim 7 wherein said releasing means includes;

a second tab located on said trip arm; and a catch means for holding said locating pin toward said base, said catch means operated by said second tab upon insertion of a cartridge to enable said means for urging to move said pin away from said base.

9. The apparatus of claim 8 wherein the distance from said first tab to said second tab determines the trip point for releasing said pin to move into said locating holes in said cartridge.

* * * * *